(12) United States Patent
Olesen

(10) Patent No.: US 10,012,395 B2
(45) Date of Patent: Jul. 3, 2018

(54) HEATING UNIT

(71) Applicant: GRUNDFOS HOLDING A/S, Bjerringbro (DK)

(72) Inventor: Thomas Young Olesen, Aaehus C (DK)

(73) Assignee: GRUNDFOS HOLDING A/S, Bjerringbro (DE)

( * ) Notice: Subject to any disclaimer, the term of this patent is extended or adjusted under 35 U.S.C. 154(b) by 755 days.

(21) Appl. No.: 14/371,078

(22) PCT Filed: Dec. 13, 2012

(86) PCT No.: PCT/EP2012/075370
§ 371 (c)(1),
(2) Date: Jul. 8, 2014

(87) PCT Pub. No.: WO2013/104481
PCT Pub. Date: Jul. 18, 2013

(65) Prior Publication Data
US 2015/0014425 A1    Jan. 15, 2015

(30) Foreign Application Priority Data
Jan. 9, 2012    (EP) ..................................... 12150495

(51) Int. Cl.
*F24D 19/10*      (2006.01)
*F24D 3/08*       (2006.01)
(Continued)

(52) U.S. Cl.
CPC ........... *F24D 19/1066* (2013.01); *F24D 3/08* (2013.01); *F24D 19/1021* (2013.01);
(Continued)

(58) Field of Classification Search
CPC .... F24D 19/1066; F24D 19/1069; F24D 3/08; F24D 19/1021; F24D 19/1036;
(Continued)

(56) References Cited

U.S. PATENT DOCUMENTS 1,847,107 A * 3/1932 Wagner ................. F16K 39/024
137/630.14
1,992,251 A * 2/1935 Stewart ............... F24D 19/1066
122/14.3
(Continued)

FOREIGN PATENT DOCUMENTS

CN               2727638 Y     9/2005
CN            201233054 Y     5/2009
(Continued)

*Primary Examiner* — Gregory Huson
*Assistant Examiner* — Daniel E Namey
(74) *Attorney, Agent, or Firm* — McGlew and Tuttle, P.C.

(57) ABSTRACT

A heating apparatus includes two heating circuits (3, 4), one for room heating (3) and one for domestic water heating (4). A primary heat exchanger (1) is provided as well as at least one secondary heat exchanger (7), for the room heating as well as a secondary heat exchanger (9) for domestic water heating. A circulation pump (6) is provided as well as a switch-over valve (5) which hydraulically integrates the primary heat exchanger (1) into the first or into the second heating circuit (3, 4). The heating circuit (4) for the domestic water heating, on operation of the heating circuit (3) for room heating, is used as a bypass conduit for the primary heat exchanger (1), wherein the switch-over valve (5) forms the bypass valve or is used as a bypass valve.

20 Claims, 9 Drawing Sheets

(51) Int. Cl.
*F24D 3/02* (2006.01)
*F16K 17/02* (2006.01)
*F16K 11/20* (2006.01)

(52) U.S. Cl.
CPC .......... F24D 19/1069 (2013.01); F16K 11/20 (2013.01); F16K 17/02 (2013.01)

(58) Field of Classification Search
CPC ............... F24D 3/02; F24D 2220/042; F24D 2220/044; F24D 2220/046; F24D 2220/0235; F24D 2220/06; F24D 2220/0207; F24D 19/10; Y02B 30/762; F16K 11/20; F16K 17/02; F16K 17/04
USPC ......... 137/328, 630, 630.13, 630.14, 630.15, 137/862; 237/8 A, 8 C, 2 A, 63, 65
IPC ................................................. F24D 3/08,3/02
See application file for complete search history.

(56) References Cited

U.S. PATENT DOCUMENTS

| | | | |
|---|---|---|---|
| 2,159,284 A * | 5/1939 | Miller | F24D 19/1066 236/9 A |
| 2,204,708 A * | 6/1940 | Smith | F24D 3/00 236/9 A |
| 2,211,573 A * | 8/1940 | McGrath | F24D 19/1066 236/36 |
| 2,781,174 A * | 2/1957 | Smith | F24D 3/08 122/15.1 |
| 2,813,683 A * | 11/1957 | Dillman | F24D 3/087 236/9 A |
| 3,426,971 A | 2/1969 | Meier | |
| 3,490,693 A | 1/1970 | Meier | |
| 3,815,813 A * | 6/1974 | Charron | F23N 5/02 236/23 |
| 4,438,782 A * | 3/1984 | Kelly | F16K 1/44 137/628 |
| 5,119,988 A * | 6/1992 | Fiedrich | F24D 19/1033 237/59 |
| 5,687,908 A * | 11/1997 | Talbert | F24H 9/0036 126/101 |
| 8,245,948 B2 * | 8/2012 | Cho | F25B 27/02 122/1 R |
| 8,851,021 B2 * | 10/2014 | Kim | F24D 17/0078 122/14.3 |
| 9,175,864 B2 * | 11/2015 | Yun | F24D 3/02 |
| 2009/0049857 A1 * | 2/2009 | Murakami | F25B 13/00 62/324.6 |
| 2009/0090310 A1 * | 4/2009 | Farrell | F24D 3/08 122/20 A |
| 2009/0320503 A1 * | 12/2009 | Kamiya | F02G 5/04 62/79 |
| 2010/0012738 A1 * | 1/2010 | Park | F01P 7/16 236/101 C |
| 2011/0017152 A1 * | 1/2011 | Min | F24D 3/08 122/19.1 |
| 2011/0073666 A1 * | 3/2011 | Jang | F24D 3/08 236/12.11 |
| 2011/0174463 A1 * | 7/2011 | Dudley | F24D 3/08 165/104.19 |
| 2011/0259025 A1 * | 10/2011 | Noh | F24D 3/08 62/160 |
| 2012/0043390 A1 * | 2/2012 | Noh | F24D 3/08 237/2 A |
| 2012/0079880 A1 * | 4/2012 | Freitag | F25B 45/00 73/198 |
| 2012/0180984 A1 * | 7/2012 | Fujitsuka | F24D 11/0214 165/61 |
| 2012/0227953 A1 * | 9/2012 | Yun | F24D 3/02 165/200 |

FOREIGN PATENT DOCUMENTS

| | | | | |
|---|---|---|---|---|
| CN | 101576281 B | 1/2011 | | |
| DE | 41 17 516 A1 | 11/1992 | | |
| DE | 42 36 967 A1 | 5/1993 | | |
| DE | 43 32 141 A1 | 3/1994 | | |
| DE | 9409782 U1 | 9/1994 | | |
| DE | 19802362 A1 | 8/1999 | | |
| DE | 19802362 C2 * | 8/2000 | ......... | F24D 19/1066 |
| DE | 100 21 216 C1 | 8/2001 | | |
| DE | 202008006790 U1 | 12/2008 | | |
| EP | 0 866 280 A2 | 9/1998 | | |
| EP | 0 987 499 A2 | 3/2000 | | |
| EP | 1528371 A1 | 5/2005 | | |
| EP | 1884717 A1 | 2/2008 | | |
| EP | 2 065 653 A2 | 6/2009 | | |
| FR | 2 211 109 A6 | 7/1974 | | |
| GB | 2090023 A * | 6/1982 | ......... | F24D 19/1012 |
| GB | 2 213 242 A | 8/1989 | | |
| GB | 2 314 914 A | 1/1998 | | |
| KR | 20090000678 U | 1/2009 | | |
| TR | 200708018 A2 | 6/2009 | | |

* cited by examiner

HEATING UNIT

CROSS REFERENCE TO RELATED APPLICATIONS

This application is a United States National Phase Application of International Application PCT/EP2012/075370 filed Dec. 13, 2012 and claims the benefit of priority under 35 U.S.C. § 119 of European Patent Application EP 12 150 495.5 filed Jan. 9, 2012, the entire contents of which are incorporated herein by reference.

FIELD OF THE INVENTION

The invention relates to a heating apparatus, in particular to a gas heater with two heating circuits, one for room heating and one for domestic water heating, with a primary heat exchanger and with at least one secondary heat exchanger for the domestic water heating, with a circulation pump and with a switch-over valve which hydraulically integrates the primary heat exchanger into the first or into the second heating circuit.

BACKGROUND OF THE INVENTION

Such heating apparatus are counted as belonging to the state of the art and are typically applied, in order one the one hand to provide the heat necessary for the room heating and on the other hand to provide the heat necessary for the warm water provision. In a primary heat exchanger, water is heated typically by way of a combustion process or also way of other suitable heat sources, in order then to be fed to a heating circuit for the room heating or a heating circuit for the provision of warm water. Thereby, it is typically the case of circulation systems which are activated by way of a switch-over valve. In normal operation, the heating circuit for the room heating is connected to the primary heat exchanger. If the heating of domestic water (service water) is necessary, which for example is triggered by way of opening a tapping valve, then the switch-over valve re-switches, so that the secondary heat exchanger for the heating of domestic water is connected to the primary heat exchanger.

For reasons of safety, one must ensure that the primary heat exchanger is always incorporated into an open cycle, in order to be able to lead away heat occurring there and to reliably prevent an overheating, in particular an evaporation of the water located there. Basically, such a cycle is always formed by the heating circuit for by the room heating, but however this can also be temporarily interrupted, for example with a closure of the thermostat valve on the radiators. A bypass conduit is provided for this case, with which one can ensure that the primary heat exchanger is always incorporated into an interconnected cycle.

For this purpose, it is counted as belonging to the state of the art, to provide a bypass conduit which is arranged parallel to the heating circuits and which connects the feed (flow) and return of the primary heat exchanger to one another and via which a typically pressure-controlled value can be activate and deactivated. If therefore, due to further supply of heat at the primary heat exchanger, the pressure within the feed conduit (also called flow conduit) rises, on exceeding a predefined pressure, the bypass valve opens and thus the bypass conduit which hydraulically connects the feed and return to one another, is released.

SUMMARY OF THE INVENTION

One constantly strives to keep the number of conduit connections and valves as small as possible, without however compromising the functionality of the apparatus, in order to keep the construction costs, maintenance costs and construction height of a heating apparatus as low as possible. Against this background, it is an object of the invention to improve a heating apparatus of the known type.

The heating apparatus according to the invention comprises at least two heating circuits, one for the room heating and one for the heating of domestic water. It comprises a primary heat exchanger, is provided with a circulation pump and with a switch-over valve which hydraulically integrates the primary heat exchanger into the first and second heating circuit. According to the invention, the heating circuit for the heating of domestic water, on operation of the heating circuit for room heating, is envisaged as a bypass conduit for the primary heat exchanger, wherein the switch-over valve forms the bypass valve or is used as a bypass valve.

The invention is particularly predestined for a heating apparatus, which is designed as a gas heater, i.e. for apparatus operated hanging on a wall or in a standing manner, whose primary heat exchanger is gas-heated. Basically, the invention can however be applied to heating apparatus of other construction types, for example with oil heaters or with district heating.

The basic concept of the present invention is to replace the separate bypass conduit typically provided with heating apparatus according to the state of the art, with a conduit which is present in any case, and to replace the bypass valve which is typically present with the state of the art, with the switch-over valve which is present in any case or to design this valve as such, i.e. that the switch-over valve also forms the bypass valve.

The design according to the invention results in a significant simplification of the heating installation with regard to its construction, since the otherwise necessary additional bypass conduit is done away with, and the bypass valve is at least integrated in the switch-over valve or however the switch-over valve itself is used as a bypass valve by way of suitable activation means. Such an arrangement is particularly advantageous with heating apparatus which largely make do without individual pipework, but are constructed of injection moulded parts which form the essential conduit connections which receive the valves, pumps and sensors necessary for operating the heating, and which are formed in a single-piece or multi-piece manner.

With regard to the solution according to the invention, it is of no importance as to whether the switch-over valve is arranged in the feed or return of the primary heat exchanger, and the same applies to the circulation pump which is generally present.

If the switch-over valve is also used as a bypass valve, which is particularly advantageous, then the otherwise common bypass valve is no longer necessary. However, suitable control-technological functions are to be provided, in order to ensure that the switch-over valve can be used as a bypass valve. For this, according to a further formation of the invention, one envisages providing means for detecting the necessity of a bypass function, preferably in the region of the primary heat exchanger, and a further control being provided, which on detecting the necessity of a bypass function activates the switch-over valve for conduit connection to the heating circuit for the heating of domestic water. The means for detecting the necessity of a bypass function, as well as the control can advantageously be formed by components which are present in any case. Thus typically, temperature and/or pressure sensors are present which can be used for this. The control which is required inasmuch as this is concerned, can advantageously be integrated into the control necessary in any case for switching-over the valve, so that the solution according to the invention can be realized without additional components, at least with a low technical effort.

It is particularly advantageous if the means for detecting the necessity of a bypass function comprise a temperature sensor which is preferably arranged in the region of the primary heat exchanger and thus in good time can detect an unallowably high temperature increase in this region. A temperature sensor can be arranged without any problem in an inexpensive manner and in a manner which is stable over the longer term.

The means for detecting the necessity of a bypass function can alternatively or additionally comprise a flow meter. The flow meter has the advantage that it can determine in good time as to whether the heating circuit for the room heating is continuous or not, thus even before an undesirably high temperature in the region of the primary heat exchanger. Only if this is not continuous, does the bypass function need to be activated.

Alternatively or additionally, according to a further formation of the invention, the means for detecting the necessity of a bypass function can comprise a pressure sensor. A pressure increase in the region of the feed conduit to the heating circuit for the room heating can be determined with this pressure sensor, and thus the bypass function can be activated accordingly. Pressure sensors are usually built in heating apparatus of the previously mentioned type, such that a component which is present in any case can be used, given a suitable arrangement. Pressure sensors are moreover inexpensive in manufacture and display long-term stability in application.

If the switch-over valve forms the bypass valve, then pressure limitation means are advantageously provided in the switch-over valve, which when exceeding a predefined pressure, form a further conduit connection between the primary heat exchanger and the bypass conduit. Such an arrangement is advantageous, since with a suitable, typically mechanical design of the pressure limitation means within the switch-over valve, a conduit connection between the primary heat exchanger and bypass conduit is then formed, without being concerned about the activation of the valve. Thus no particular provisions are to be made with regard to control technology with such an arrangement, which is advantageous.

On the other hand, according to an advantageous formation of the heating apparatus according to the invention, the switch-over valve can be designed for actuating in two modes, and specifically in a first mode for the rapid opening, and in a second mode for the slow closing. As the case may be, a further mode for the slow opening can be envisaged, wherein the mode for rapid opening in any case is used for achieving the bypass function. Such different modes can advantageously be carried out with regard to control technology, thus as a rule without any change with regard to component technology.

According to a further formation of the invention, one envisages activating the switch-over valve in a modulating manner for producing a flow resistance. Such an activation is typically possible without design changes on the switch-over valve and can be achieved merely by way of the implementation in the control apparatus with regard to software, which is advantageous.

If the switch-over valve is arranged in the feed to the heating circuits, which can be envisaged according to the invention, then this is arranged hydraulically practically directly downstream of the primary heat exchanger. If the switch-over valve is arranged in the return to the heating circuits, which can also be envisaged according to the invention, then the heating circuits on the feed side are continuously open and are connected to one another and to the return of the primary heat exchanger.

A particularly compact construction manner results if the switch-over valve is integrated in the pump housing.

Advantageously, the control for the switch-over valve is arranged in the terminal box of the motor of the circulation pump, in particular in the region of the control of an electronic speed controller for the motor, or is integrated into this. With modern circulation pumps which are closed-loop controlled with regard to the speed, the control for the speed controller or speed closed-loop controller is integrated in a digital microprocessor which is mostly only partly used with regard to its capability, so that the functions necessary for the control of the switchover valve can yet be advantageously integrated here. As the case may be, here one can also provide a separate control in the form of a digital processor, with little changes with regard to the design.

According to the invention, thus the conduit of the heating circuit for the heating of domestic water and which is present in any case in the heating apparatus is used as a bypass conduit for the primary heat exchanger on operation of the heating circuit for the room heating. The conduit thereby consists of the respective conduit sections and typically of a secondary heat exchanger, in particular plate heat exchanger, which is integrated therebetween, as is counted as belonging to the state of the art with gas heaters and other heating apparatus of this type.

The invention is hereinafter explained in more detail by way of embodiment examples represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
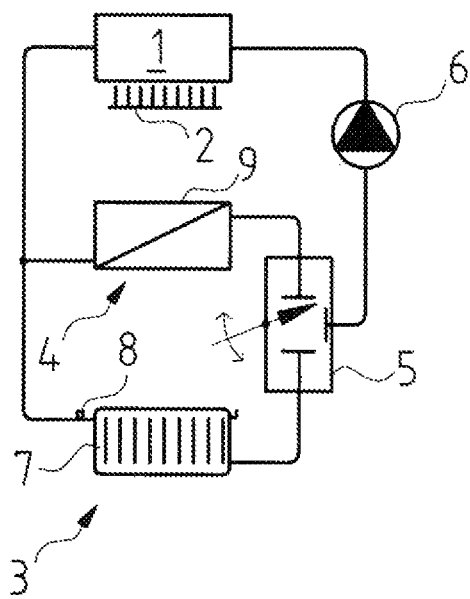
FIG. 1 is a diagram of the basic hydraulic construction of a heating apparatus with two heating circuits with one of different arrangements of the pump and switch-over valve.

Referring to the drawings in particular, the heating apparatus which are represented in the simplified hydraulic circuit diagram are gas heaters with which a primary heat exchanger 1 is provided, in which a heat transfer medium, typically water, is heated by way of a combustor 2 in which gas is combusted.

The heating apparatus has two heating circuits, specifically a heating circuit 3 for the room heating, and a heating circuit 4 for heating domestic water. The heating circuits 3 and 4 are connected by way of a switch-over valve 5 to the primary heat exchanger 1, into a hydraulic cycle, in which the heat transfer medium is circulated by way of a centrifugal pump 6. Thereby, the heating circuit 3 for the room heating has one or more secondary heat exchangers 7, for example, in the form of radiators which are connected in series and/or parallel and are hydraulically connected in each case by way of a thermostat valve 8.

The heating circuit 4 for heating the domestic water comprises a secondary heat exchanger 9 which, for example, is designed as a plate heat exchanger and whose one hydraulic side can be integrated into the heating cycle with the primary heat exchanger 1, and domestic water to be heated flows through its other hydraulic side.

In normal operation, the centrifugal pump 6 delivers the water through the primary heat exchanger 1, where it is heated, and from there, when the thermostat valve 8 is opened, gets to one or more secondary heat exchangers 7, from where, in the return, it flows again to the circulation pump 6. As soon as warm domestic water is to be heated, the switchover valve 5 is re-actuated and the secondary heat exchanger 9 is integrated into the circuit or cycle with the primary heat exchanger 1.

It is necessary for one or more thermostat valves 8 in the heating circuit for the room heating to be at least partly opened, in order to ensure that in normal room heating operation, in which the switch-over valve 5 integrates the primary heat exchanger 1 into a cycle with the secondary heat exchangers 7, that the heat transferred in the primary heat exchanger 1 to the heat transfer medium is also led away, without an overheating taking place there. This however e.g. does not need to be the case e.g. when subjected to strong rays of the sun. It can then occur that the heating circuit 3 for the room heating is interrupted and the heating circuit 4 for domestic water heating is likewise interrupted by the switch-over valve 5. In order in this situation, to avoid an overheating in the primary heat exchanger 1 and to ensure that the heat transfer medium is led away or is led in the cycle, the cycle is closed by way of the switch-over valve 5, by way of the heating circuit 4 for providing warm domestic water being switched as a bypass. The necessary removal of heat can be ensured at least briefly by way of this.

The basic construction of such a heating apparatus is represented in detail by way of FIGS. 1-4, wherein with the design according to FIG. 1, the circulation pump 6 is arranged in the return of the heating circuits 3, 4 or in the feed of the primary heat exchanger 1. The switch-over valve 5 there is arranged in the return of the heating circuit 3, 4 upstream of the circulation pump 6. With the embodiment according to FIG. 2, the circulation pump 6 is located in the return of the heating circuits 3, 4 and in the feed to the primary heat exchanger 1, in contrast the switch-over valve 5 is arranged in the return of the primary heat exchanger 1, thus in the feed of the heating circuits 3 and 4.

Figure 3:
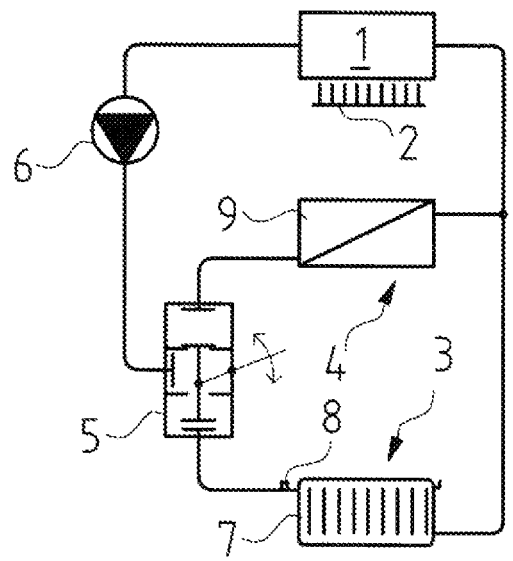
FIG. 3 is a diagram of the basic hydraulic construction of a heating apparatus with two heating circuits with another of different arrangements of the pump and switch-over valve.

With the heating apparatus according to FIG. 3, the circulation pump 6 as well as the switch-over valve 5 are arranged in the return of the primary heat exchanger 1, i.e. in the feed of the heating circuits 3 and 4.

Figure 4:
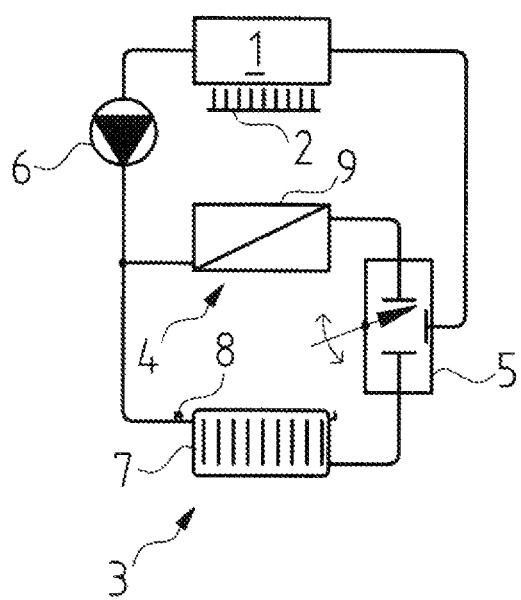
FIG. 4 is a diagram of the basic hydraulic construction of a heating apparatus with two heating circuits with another of different arrangements of the pump and switch-over valve.

Finally, FIG. 4 shows an embodiment variant, with which the circulation pump 6 is arranged in the return of the primary heat exchanger 1 and in the feed to the heating circuits 3 and 4, whereas the switch-over valve 5 is arranged in the return of the heating circuits 3 and 4 and in the feed to the primary heat exchanger 1.

Common to all embodiments is the fact that the heating circuit 3 can be used as a bypass conduit by way of the switch-over valve 5.

Figure 5:
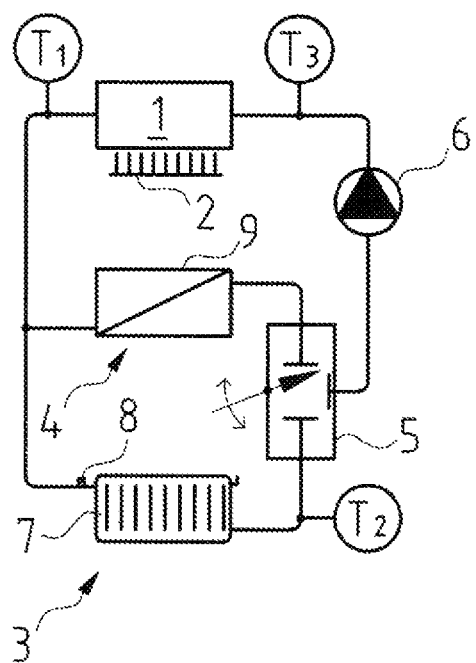
FIG. 5 is a simplified hydraulic circuit diagram of an arrangement of sensors in the heating apparatus.
Figure 6:
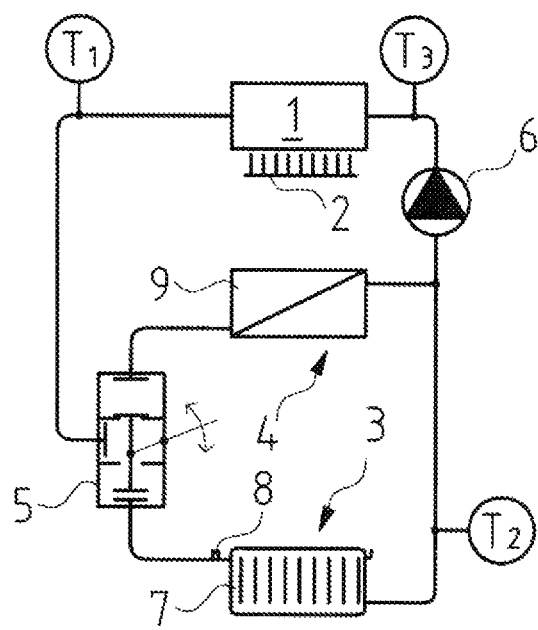
FIG. 6 is a simplified hydraulic circuit diagram of another arrangement of sensors in the heating apparatus.
Figure 7:
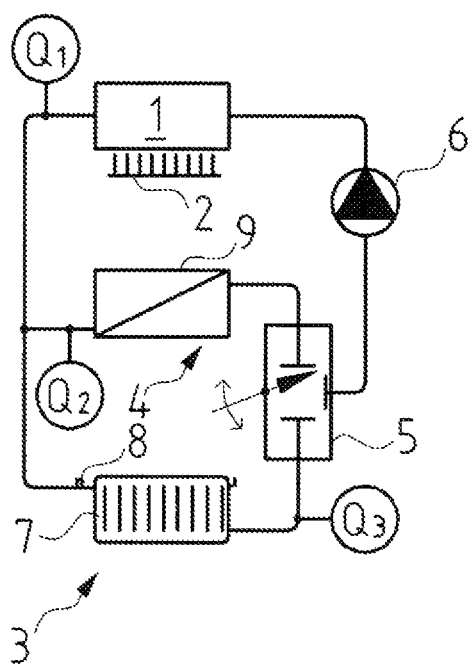
FIG. 7 is a simplified hydraulic circuit diagram of another arrangement of sensors in the heating apparatus.
Figure 8:
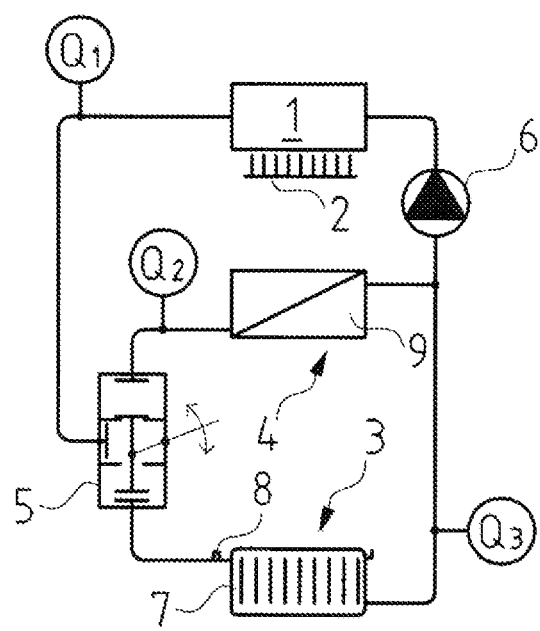
FIG. 8 is a simplified hydraulic circuit diagram of another arrangement of sensors in the heating apparatus.

Sensor means are necessary, in order to detect the necessity of a bypass function and a suitable activation of the switch-over valves 5 which this entails. In the simplest form, a temperature sensor in the region of the primary heat exchanger and which determines an impending overheating is sufficient. In each case, three temperature sensors T1, T2, and T3 are represented by way of FIGS. 5 and 6, as are usually to be arranged, in order to determine the necessity of a bypass function. In both embodiment examples, a temperatures sensor T1 is arranged behind the primary heat exchanger 1 in the through-flow direction, and a further temperature sensor 3 is arranged in front of the primary heat exchanger 1 in the through-flow direction. With the help of these two temperature sensors T1 and T3, one can reliably determine whether a through-flow through the primary heat exchanger 1 in the required quantity takes place or not, if the combustor 2 is switched on. Usefully, a further temperature sensor T2 is arranged in the return of the heating circuit 3, so that one can determine whether a through-flow takes place or not via the temperature difference between T2 and T3. By way of example, and by way of FIGS. 7 and 8, it is shown how the necessity of a bypass function can be sensed by way of flow meters Q1-Q3. Basically, one flow meter Q1 which is connected in series to the primary heat exchanger 1 is sufficient, in order to determine whether a throughput through the primary heat exchanger is effected or not. If this is not effected in the switch position, in which the heating circuit 3 for the room heating is connected to the primary heat exchanger 1, then this is recognized by the control by way of the sensor signal of the sensor Q1 and the bypass function is activated. Alternatively or additionally, this can also be determined by the flow meter Q3 which is arranged in the return of the heating circuit 3. Finally, a flow meter Q2 is arranged in front of the secondary heat exchanger 9 and determines the throughput through the heating circuit 4 or the bypass. In the embodiments according to FIGS. 7 and 8, the pump is represented in the feed to the primary heat exchanger 1. It is to be understood that this can be arranged in the return in the same manner.

Figure 9:
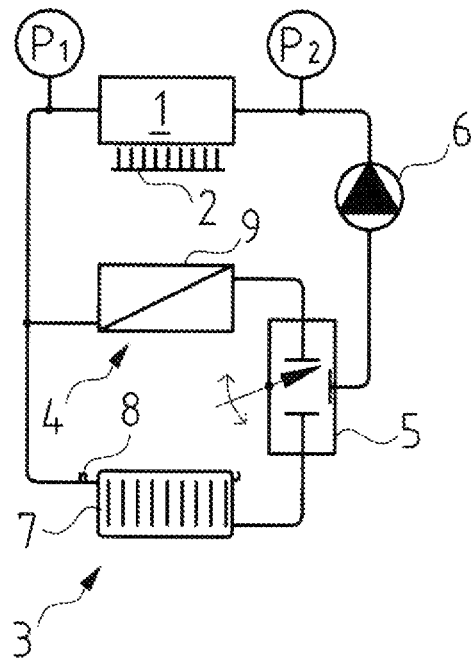
FIG. 9 is a simplified hydraulic circuit diagram of another arrangement of sensors in the heating apparatus.
Figure 10:
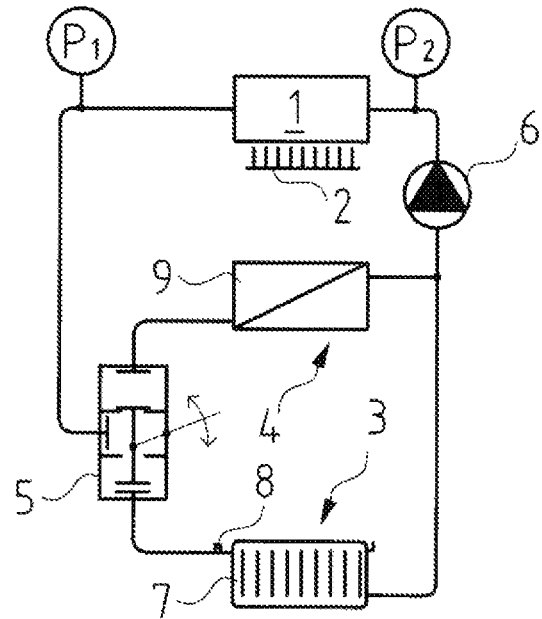
FIG. 10 is a simplified hydraulic circuit diagram of another arrangement of sensors in the heating apparatus.

By way of example, it is shown in FIGS. 9 and 10 how the necessity of a bypass activation can be determined by way of pressure sensors P1 and P2. The pressure sensor P1 is arranged after the primary heat exchanger in the through-flow direction, and the pressure meter P2 is arranged in front of the primary heat exchanger 1 and behind the circulation pump 6. A usual return block which is not shown, is in the region of the circulation pump 6, so that with an increasing heating of the primary heat exchanger 1 without circulation, the heat transfer medium expands and the pressure rises, which can be determined via the pressure sensor P1 and/or the pressure sensor P2, by which means one can then determine the necessity of the bypass activation and the bypass is activated by way of switching over the valve 5. In the embodiment examples according to FIGS. 9 and 10, the pump is represented in the feed to the primary heat exchanger 1. It is to be understood that this can be arranged in the return in the same manner.

For switching between the heating circuits 3 and 4, it is counted as belonging to the state of the art to provide a 3/2 way valve which is controlled by way of a lever, on whose one end a linear motor 10 engages and whose other end moves a switch body or valve body 11 of the switch-over valve 5, in order to respectively release or block a conduit connection from or to the primary heat exchanger 1, from or to one of the heating circuits 3 or 4.

As has already been explained, the bypass function can be effected by way of a suitable activation of the switch-over valve 5 or however the switch-over valve 5 itself can form the bypass function. The last embodiments are described by way of FIGS. 11-18. These Figures each show a switch-over valve 5, which is a 3/2-way valve whose valve body 12, via a lever 13 pivotably mounted in the valve housing, is controlled by way of a linear motor 10 arranged outside on the valve housing. The valve representations are all greatly simplified and each respectively show the conduit connections of the heating circuit 3 for the room heating, of the heating circuit 4 for heating the domestic water and the connection from or to the primary heat exchanger 1 according to the arrows, which represent the flow direction. These representations are to be seen in the context of the arrangements according to FIGS. 1-9. Thus the switch-over valve 5 which is represented by way of FIG. 11, is arranged as is represented in FIG. 1, specifically between the return of the heating circuit 3 for the room heating, the return of the heating circuit 4 for heating the domestic water and the conduit leading to the primary heat exchanger 1.

Figure 11:
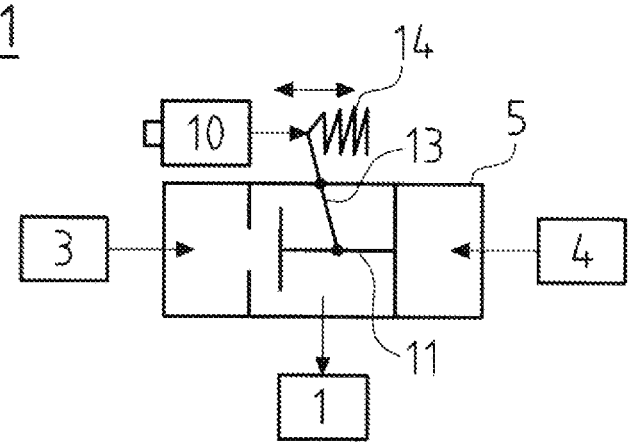
FIG. 11 is a greatly simplified schematic representation showing one of different embodiments of switch-over valves according to the invention.

With the embodiment according to FIG. 11, the linear motor 10 operates against the force of a spring 14 in the closure direction of the heating circuit 3 for the room heating. Since the lever 13 is impinged by the linear motor 11 only on one side, and is impinged by the force of the spring 14 in 20 the other direction, the valve body 12 can be moved against the force of the spring 14 out of its position closing the heating circuit 4 for heating the domestic water, if for example the pressure in the primary heat exchanger 1 increases by way of the expansion of the heat transfer medium due to heating, and a passage through the heating circuit 3 for the room heating is however not possible due to closed thermostat valves 8. The switch-over valve 5 here, with regard to the heating circuit 4, is equipped with a pressure-limitation function, which when exceeding a predefined pressure, opens the connection from the heating circuit 4 to the primary heat exchanger 1 and thus activates the bypass function via the heating circuit 4.

Figure 2:
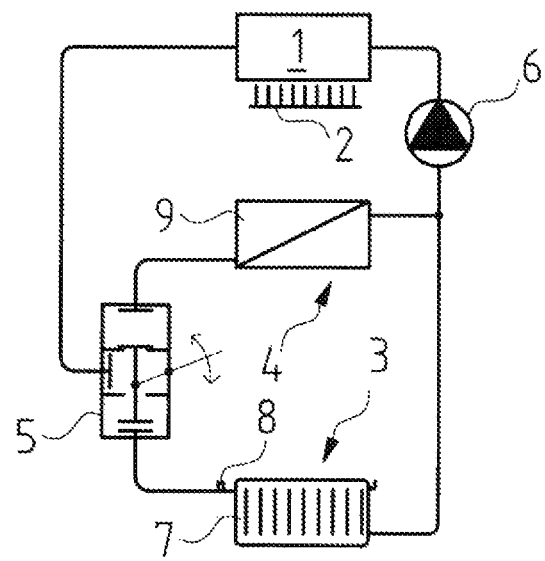
FIG. 2 is a diagram of the basic hydraulic construction of a heating apparatus with two heating circuits with another of different arrangements of the pump and switch-over valve.
Figure 12:
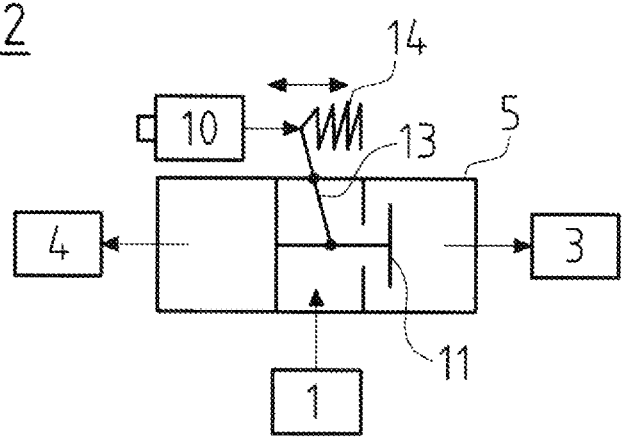
FIG. 12 is a greatly simplified schematic representation showing another of different embodiments of switch-over valves according to the invention.

The switch-over valve 5 represented by way of FIG. 12, which with regard to the motor 10, spring 14 and lever 13, is constructed just as the previously described one, but has a valve arrangement which is rotated by 180° as compared to this, is envisaged for an arrangement as is represented by way of FIG. 2. There, given a heating circuit 3 for the room heating, which is closed by the thermostat valves 8, the switch-over valve 5 automatically opens the conduit connection to the heating circuit 4 for heating the domestic water, on exceeding a predefined pressure in the region of the primary heat exchanger 1, when the switch-over valve 5 is located in the position shown in FIG. 12, in which the heating circuit 3 for the room heating is connected to the primary heat exchanger 1.

Figure 13:
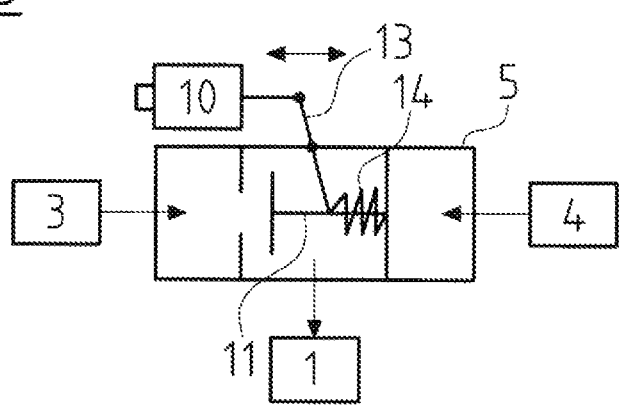
FIG. 13 is a greatly simplified schematic representation showing another of different embodiments of switch-over valves according to the invention.

With the embodiment variant represented by way of FIG. 13, which in its manner of functioning corresponds to that previously described by way of FIG. 11, the linear motor 10 is connected to the lever 13 in an articulated manner, thus can move this lever in both directions. However, here the lever end lying within the valve is connected via a spring 14 to the valve body 11, so that in the position represented in FIG. 13, on exceeding the pressure from the heating circuit beyond a predefined amount, the valve body 12 against the force of the spring 14 connects the heating circuit 4 at the return side to the feed to the primary heat exchanger 1 and thus opens a bypass.

Figure 14:
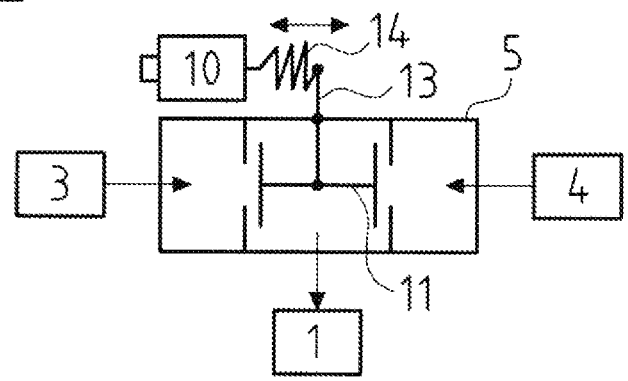
FIG. 14 is a greatly simplified schematic representation showing another of different embodiments of switch-over valves according to the invention.

FIG. 14 shows a further embodiment variant of the switch-over valve 5 in FIG. 1. There, a spring 14 is arranged between the linear motor 10 and the lever 13, which fulfils the previously described pressure limitation function, i.e. opens the heating circuit 4 for the domestic water heating on reaching a predefined pressure and thus activates the bypass function.

Figure 15:
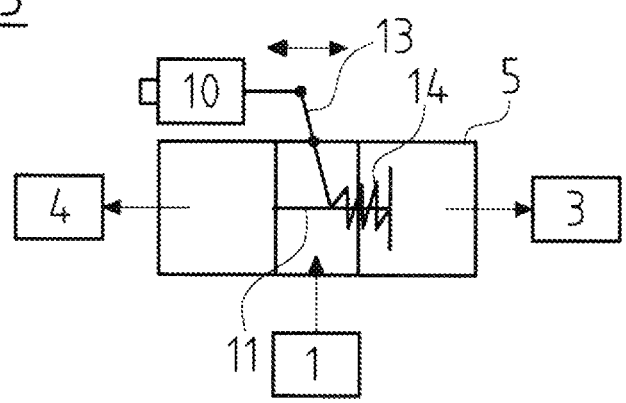
FIG. 15 is a greatly simplified schematic representation showing another of different embodiments of switch-over valves according to the invention.

FIG. 15 shows the valve construction of the switch-over valve 5 with a spring 14 between the valve-side end of the lever 13 and the valve body 11, as in FIG. 13, but for an arrangement of the switch-over valve 5 according to the embodiment according to FIG. 2.

Figure 16:
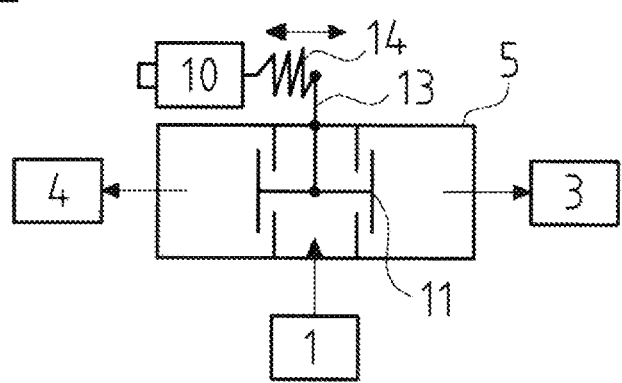
FIG. 16 is a greatly simplified schematic representation showing another of different embodiments of switch-over valves according to the invention.

FIG. 16 illustrates a valve design, which functionally corresponds to that described by way of FIG. 14, with which specifically a spring 14 is arranged between the linear motor 10 and the lever 13 and which however is otherwise envisaged for a valve arrangement as is described by way of FIG. 12, specifically according to the arrangement according to FIG. 2, with which the switch-over valve 5 is arranged between the primary heat exchanger 1 and the feeds to the heating circuits 3 and 4.

Figure 17:
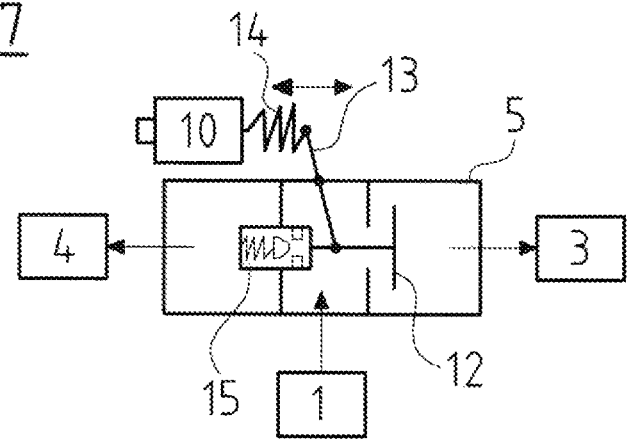
FIG. 17 is a greatly simplified schematic representation showing another of different embodiments of switch-over valves according to the invention.

With the embodiment variants represented by FIG. 17, a pressure limitation valve 15 is integrated into the valve body 12 itself and this valve, on exceeding a predefined pressure, opens the conduit connection between the primary heat exchanger 1 and the feed of the heating circuit 4 for domestic water heating, when the valve body 12 is in the closure position.

Figure 18:
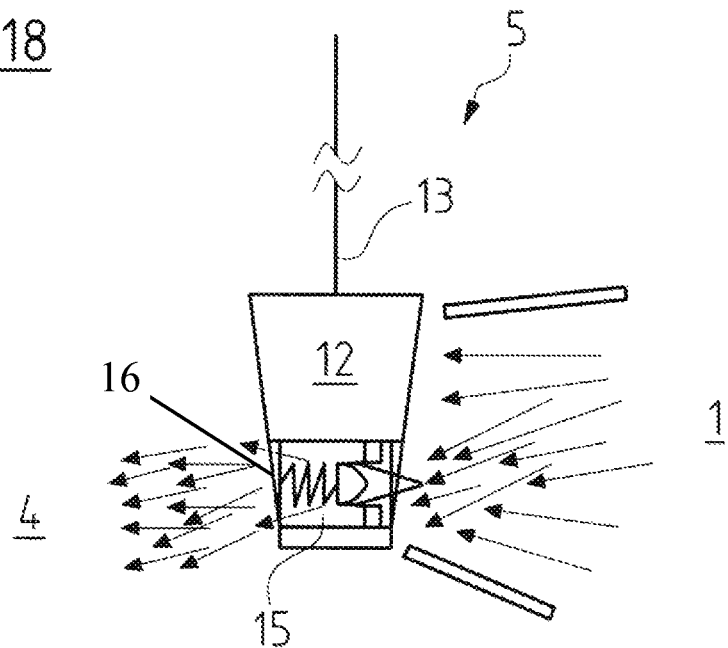
FIG. 18 is a greatly simplified schematic representation showing another of different embodiments of switch-over valves according to the invention.

By way of FIG. 18, it is shown by way of example how a valve body 12 with an integrated pressure limitation valve 15 can be constructed. The valve body 12 here is designed in a paddle-like manner, as is to be found with such types of switch-over valves according to the state of the art. Thereby, the paddle as a valve body 12 is seated at the end of a lever 13 which is led in a sealing manner through the housing wall and at its other end is actuated by way of a linear motor 10. This valve body 12 can selectively close the one or other valve seat within the housing. Only the valve seat is represented in FIG. 18 and is conductively connected to the primary heat exchanger 1.

The paddle-like valve body 12 comprises a central opening 16, into which a pressure limitation valve 15 is integrated, so that with a pressure increase from the primary heat exchanger 1, the pressure limitation valve 15 opens on exceeding a predefined pressure and thus releases the passage to the heating circuit for the domestic water heating 4 and thus releases the bypass, despite the valve body 12 arranged in the closure position.

Figure 19:
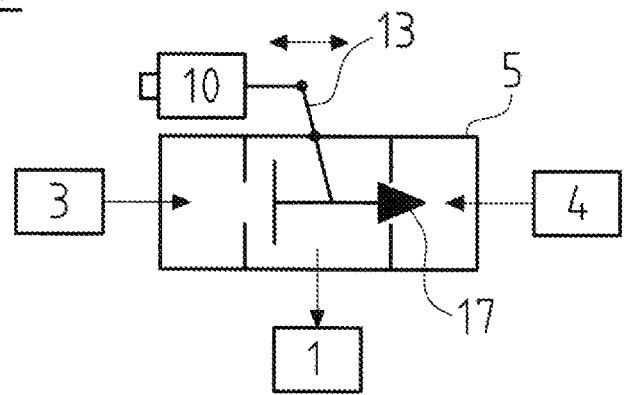
FIG. 19 is a greatly simplified schematic representation showing another of different embodiments of switch-over valves according to the invention.
Figure 20:
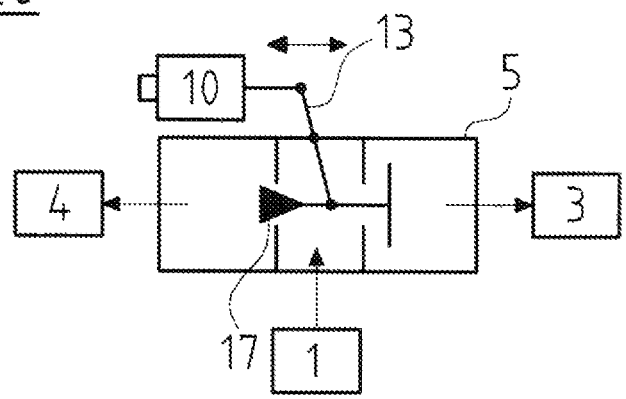
FIG. 20 is a greatly simplified schematic representation showing another of different embodiments of switch-over valves according to the invention.
Figure 21:
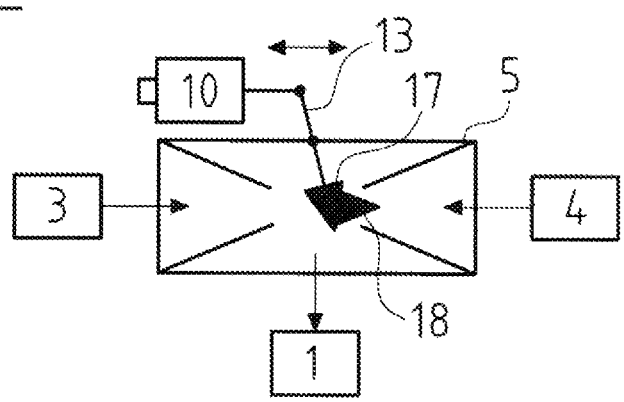
FIG. 21 is a greatly simplified schematic representation showing another of different embodiments of switch-over valves according to the invention.

Embodiment examples of switch-over valves 5, with which a pressurelimitation function is not integrated, but with which the bypass activation is effected exclusively by the electronic control by way of the linear motor 10 are represented, by way of FIGS. 19-21. A linear motor 10 via a lever 13 also controls a valve body 17 with the embodiments which are shown here. The valve body 17 however in the region of the valve seat which connects a conduit from or to the primary heat exchanger 1, to the heating circuit 4 for the provision of warm water, is designed in a manner such that with the initial opening, it is not the whole cross section, but firstly a reduced cross section which is released. The valve body 12 for this reason has a conically tapering section which in combination with the associated valve set is arranged such that with an initial opening, the bypass function is firstly activated, i.e. a certain cross section of the conduit is released, in order to realize the bypass function via the heating circuit 4 for the domestic water heating. The full cross section however is not released until the conical section is distanced further from the valve seat and thus reaches the directed position, in which the heating circuit 4 for the heating of the domestic water is connected to the primary heat exchanger 1. Thereby, as the embodiments according to FIGS. 19-21 show, the arrangement of the conical section with respect to the flow direction is aligned between the heating circuit 4 and the primary heat exchanger 1 such that a force supporting the opening of this conduit connection is initially given. A modulating activation of the switch-over valve 5 is possible with such valve bodies 17.

It is to be understood that the previously described valve arrangement whose function is to be deduced from the drawing without further ado, is greatly simplified and only represented according to its functioning principle. Thus for example it is represented by way of FIG. 21, how a paddle-like valve body 17 can be designed, specifically with a section 18, in order to realize the previously described function.

With the represented linear motors 10 it is typically the case of spindle drives. Here, however only can also apply electric linear motors or as the case may be also hydraulic ones.

As is to be deduced from the above embodiments, it is of no significance for the bypass according to the invention as to whether the switch-over valve is seated in the feed or in the return, and is also independent of whether the circulation pump is arranged in front of or behind the primary heat exchanger. However, it is to be understood that the specific design of the switch-over valve of the arrangement is to be accordingly adapted to the arrangement within the installation, as has been outlined by way of the above embodiment examples.

While specific embodiments of the invention have been shown and described in detail to illustrate the application of the principles of the invention, it will be understood that the invention may be embodied otherwise without departing from such principles.

The invention claimed is:

1. A heating apparatus comprising:
   two heating circuits including a first heating circuit for room heating and a second heating circuit for domestic water heating;
   a primary heat exchanger;
   at least one secondary heat exchanger for the domestic water heating;
   another secondary heat exchanger for the room heating;
   a circulation pump;
   a switch-over valve which hydraulically integrates the primary heat exchanger into the first or into the second heating circuit wherein the heating circuit for the domestic water heating, on operation of the heating circuit for room heating, forms a bypass conduit for the primary heat exchanger, and the switch-over valve forms the bypass valve;
   a detection means for detecting the necessity of a bypass function, the detection means being provided in the region of the primary heat exchanger; and
   a control which on detecting the necessity of the bypass function, activates the switch-over valve for the conduit connection to the heating circuit for domestic water heating to define a bypass state of the switch-over valve, wherein a bypass fluid flow path is formed when the switch-over valve is in the bypass state, the bypass fluid flow path comprising the second heating circuit, the switch-over valve, the circulation pump and the primary heat exchanger, wherein fluid moves along the bypass fluid flow path when the switch-over valve is in the bypass state, wherein no bypass valve is integrated in the switch-over valve, wherein the switch-over valve is controlled such that the switch over valve operates as the bypass valve, wherein an outlet line of the another secondary heat exchanger is connected to the at least one secondary heat exchanger for the domestic water heating in the bypass state.

2. A heating apparatus according to claim 1, wherein the detection means for detecting the necessity of a bypass function comprises a temperature sensor.

3. A heating apparatus according to claim 1, wherein the detection means for detecting the necessity of bypass function comprises a flow meter.

4. A heating apparatus according to claim 1, wherein the detection means for detecting the necessity of a bypass function comprise a pressure sensor.

5. A heating apparatus according to claim 1, further comprising a pressure-limitation means provided in the switch-over valve and on exceeding a predefined pressure form a further conduit connection between the primary heat exchanger and the bypass conduit.

6. A heating apparatus according to claim 1, wherein the switch-over valve is designed for actuation in two modes comprising a first mode for a rapid opening and a second mode for a slow closure.

7. A heating apparatus according to claim 1, wherein the switch-over valve is activatable in a modulating manner for producing a flow resistance.

8. A heating apparatus according to claim 1, wherein the switch-over valve is arranged in the feed to the heating circuits.

9. A heating apparatus according to claim 1, wherein the switch-over valve is arranged in the return to the heating circuits.

10. A heating apparatus according to claim 1, further comprising a pump with a pump housing, wherein the switch-over valve is arranged in the pump housing.

11. A heating apparatus according to claim 1, further comprising a circulation pump motor and a terminal box, the circulation pump motor being connected to the circulation pump, wherein the control for the switch-over valve is arranged in the terminal box of the motor of the circulation pump.

12. A heating method comprising:
   providing a heating apparatus comprising:
      two heating circuits including a first heating circuit for room heating and a second heating circuit for domestic water heating;
      a primary heat exchanger for introducing heat into the heating circuits;
      at least one secondary heat exchanger for the domestic water heating;
      another secondary heat exchanger for the room heating;
      a circulation pump;
      a switch-over valve which hydraulically integrates the primary heat exchanger into the first or into the second heating circuit wherein the heating circuit for the domestic water heating, on operation of the heating circuit for room heating, forms a bypass conduit for the primary heat exchanger, and the switch-over valve forms the bypass valve;
      a detection means for detecting the necessity of a bypass function the detection means being provided in the region of the primary heat exchanger; and
      a control which on detecting the necessity of the bypass function, activates the switch-over valve for the conduit connection to the heating circuit for domestic water heating to define a bypass state of the switch-over valve, wherein a bypass fluid flow path is formed when the switch-over valve is in the bypass state, the bypass fluid flow path comprising the second heating circuit, the switch-over valve, the circulation pump and the primary heat exchanger, wherein fluid moves along the bypass fluid flow path when the switch-over valve is in the bypass state, wherein no bypass valve is integrated in the switch-over valve, wherein the switch-over valve is controlled such that the switch over valve operates as the bypass valve, wherein an outlet line of the another secondary heat exchanger is connected to the at least one secondary heat exchanger for the domestic water heating in the bypass state.

13. A heating method according to claim 12, further comprising:
   detecting the necessity of a bypass function with the detection means provided in the region of the primary heat exchanger.

14. A heating method according to claim 13, wherein the detection means for detecting the necessity of a bypass function comprises a temperature sensor.

15. A heating method according to claim 13, wherein the detection means for detecting the necessity of bypass function comprises a flow meter.

16. A heating method according to claim 13, wherein the detection means for detecting the necessity of a bypass function comprise a pressure sensor.

17. A heating method according to claim 12, further comprising:
   providing a pressure-limitation means in the switch-over valve acting on exceeding a predefined pressure form a further conduit connection between the primary heat exchanger and the bypass conduit.

18. A heating method according to claim 12, wherein the switch-over valve actuates in two modes comprising a first mode for a rapid opening and a second mode for a slow closure.

19. A heating method according to claim 12, wherein the switch-over valve is activated in a modulating manner for producing a flow resistance.

20. A heating apparatus comprising:
   a plurality of heating circuits, the plurality of heating circuits comprising a first heating circuit for room heating and a second heating circuit for domestic water heating;
   a primary heat exchanger;
   a secondary domestic water heat exchanger for the domestic water heating;
   a secondary room heating heat exchanger for the room heating, the secondary room heating heat exchanger comprising an outlet;
   an outlet line connected to the outlet of the secondary room heating heat exchanger;
   a circulation pump;
   a switch-over valve which hydraulically integrates the primary heat exchanger into the first heating circuit or into the second heating circuit, wherein the heating circuit for the domestic water heating, on operation of the heating circuit for room heating, forms a bypass conduit for the primary heat exchanger, the switch-over valve comprising a bypass position, the outlet line being in fluid communication with the secondary domestic water heat exchanger when the switch-over valve is in the bypass position.

* * * * *